| United States Patent [19] | [11] Patent Number: 4,552,072 |
|---|---|
| Kardinal et al. | [45] Date of Patent: Nov. 12, 1985 |

[54] INSTALLATION FOR DESTINATION ADJUSTMENT OF DESTINATION IDENTIFICATION MARKS FOR RECEPTACLES

[75] Inventors: Hans-Joachim Kardinal; Herbert Lehmann; Klaus-Peter Dziggel, all of Berlin, Fed. Rep. of Germany

[73] Assignee: Siemens Aktiengesellschaft, Berlin & Munich, Fed. Rep. of Germany

[21] Appl. No.: 269,555

[22] Filed: Jun. 2, 1981

[30] Foreign Application Priority Data

Jun. 10, 1980 [DE] Fed. Rep. of Germany ....... 3022130

[51] Int. Cl.⁴ .............................................. B61J 3/00
[52] U.S. Cl. ...................................... 104/88; 198/352
[58] Field of Search ................. 104/88; 198/350, 351, 198/352, 353; 246/27, 28 R; 340/825.3, 825.49; 235/384; 414/136

[56] References Cited

U.S. PATENT DOCUMENTS

| 3,502,038 | 3/1970 | Wesener | 104/88 |
| 4,056,063 | 11/1977 | Ritter | 104/88 |
| 4,262,599 | 4/1981 | Ahr | 198/350 |

FOREIGN PATENT DOCUMENTS

| 296153 | 2/1972 | Austria . | |
| 1230357 | 12/1966 | Fed. Rep. of Germany . | |
| 2436376 | 2/1976 | Fed. Rep. of Germany . | |
| 2141189 | 3/1976 | Fed. Rep. of Germany . | |
| 2084775 | 4/1982 | United Kingdom | 198/352 |

Primary Examiner—Robert J. Spar
Assistant Examiner—Jonathan D. Holmes
Attorney, Agent, or Firm—Hill, Van Santen, Steadman & Simpson

[57] ABSTRACT

A destination adjustment installation for positioning destination identification which is movable on a receptable in a path direction of parallel guidance strips by the use of an actuating element. The actuating element is designed as a stationary limit stop and the shifting movement of the destination identifications is obtained from the passage of the receptacles past the destination adjustment installation whereas the actuating element engages in the shift region from the time of its contact with the destination identification until the output of a control command after further drive of the receptable by a distance corresponding to the distance of the destination position from the initial position. The invention can be employed in particular for shifting identifications of electrically driven conveyor vehicles running on profile rails for the purpose of transporting files.

15 Claims, 4 Drawing Figures

INSTALLATION FOR DESTINATION ADJUSTMENT OF DESTINATION IDENTIFICATION MARKS FOR RECEPTACLES

This is a division of application Ser. No. 416,606, filed on Sept. 10, 1982, U.S. Pat. No. 4,441,889 which is a continuation-in-part of Ser. No. 230,062, filed Jan. 29, 1981, U.S. Pat. No. 4,358,293.

BACKGROUND OF THE INVENTION

1. Field of the Invention

This invention relates in general to a destination adjustment installation for the adjustment of a container identification code on a lateral wall of a receptacle guided on a conveyor path in a path direction which is parallel to a guide strip and the container identification mark being movable from an initial position which is the same for all receptacles and to different destination characteristic positions and comprises an actuating element which engages during displacement with a positioning device according to a destination memory of a controlled installation of the destination adjustment installation.

2. Description of the Prior Art

A destination adjustment installation is described in German OS No. 2,141,189 and it is arranged at the location of a collecting path for empty receptacles which is provided at a central location and serves the purpose of destination adjustment of empty receptacles which can be called for by the individual stations of a transport system depending upon its requirements. One of the major objectives of such central collecting path for empty receptacles is reduction of the cost of requirement for supply of empty receptacles to be maintained at the individual stations. The method of operation is such that an operating individual transmits at a transmitting station, by means of a corresponding switching device, a request to the collecting path or to the control installation pertaining to the destination adjustment installation. The empty receptacle prior to its entry into the actual transport path passes by the destination adjustment installation where the destination characteristic position of the individual destination identification marks corresponding to the requesting station is adjusted. A gripper is introduced in the destination adjustment installation which gripper is driven into the region of the movable or displaceable destination identification and which exhibits a drive which causes movement of the gripper along the length of the guide strip and thus movement of the destination identifications which are seized by the gripper within the guide strip.

The structural and drive means results in a high cost because on account of the necessity of a first drive device which conveys the gripper to the receptacles and a second drive device which moves the gripper. It is also aggravating to have the comparative low adjustment speed with such systems. In the case of the prior art destination adjustment installation for each destination adjustment three successive operating steps must be carried out. These are:

1. Lateral movement of the gripper to the receptacle;
2. Adjustment of the gripper in the path direction; and
3. Subsequent lateral moving of the gripper away from the receptacle.

The disadvantages of the low adjustment speed of a destination adjustment installation is avoided by similar installation described in German OS No. 2,436,376. This destination adjustment installation exhibits for each movable destination identification a number of limit stops corresponding to the number of possible different destination adjustment positions which limit stops are selectively advanced by means of a feed device into the movement region of the destination identifications and in the case of a relatively aligned position of the respective destination characterizing position with the respective limit stop are again withdrawn from the displacement region. In the simplest embodiment the feed installations can be designed in the form of lifting magnets which have cores that are moved into the displacement region of the destination identification means. In view of the comparatively large number of different destination characteristic positions which is conventional in practice the destination adjustment device requires a correspondingly high apparatus outlay. Thus for example in the case of three guide strips per receptacle with ten different destination characterizing positions for each it would require 30 lifting magnets for the adjustment of all possible destinations. A serious deficiency of this destination adjustment installation also results in that it can be employed only for destination identification systems in which a single destination identification is moved in a guide strip.

SUMMARY OF THE INVENTION

The object of the present invention is to expand the application possibilities for a destination adjustment installation of this type with a low apparatus outlay cost. According to the invention this is achieved in that the actuating element is designed as a stationary limit stop and the shifting movement of the destination identification results from driving of the receptacles past the destination adjustment installation such that the actuating element from the time of its resting against the destination identification which is in the initial position until the release of a control command by the control installation after further continued driving of the receptacle has occurred engages and moves into the displacement region by a distance corresponding to the distance of the destination position from the initial position with the object of displacing the destination identification.

Since the initial position of the destination identification is equal for all receptacles of a conveyor system the time of commencement of engagement of the stationary limit stop against the destination identification corresponds to a very specific relative position between arriving receptacles and the destination adjustment installation. The transmission of a corresponding signal to the control installation can therefore be accomplished without problems and can take place by means of a stationary contact installation which is switched by an actuating device secured to the receptacle. Since the conveyor receptacles with shiftable destination identifications customarily have at least one stationary identification which serves as a reference mark for the sampling of the positions of the shifted destination identifications, it is advisable to employ this reference mark for obtaining a signal representing the time that the stationary limit stop rested against the initial position.

The further drive of the receptacle for a distance corresponding to the distance of the destination corresponding position from the initial position can also be realized in various manners. Insofar as a constant speed of the receptacle is assured at least during its drive past the target adjustment installation, the distance of the destination corresponding position from the initial position corresponds precisely to a specific driving time after which the control installation transmits to the adjustment or positioning device a corresponding adjustment or positioning command. A constant speed for the prevention of slippage between the receptacle and conveying medium can be obtained with different conveyor systems. Thus, for example conveyor systems are known in which conveyor receptacles with rollers run on profile rails and have a separate drive device which is supplied with drive energy through a conductor or third rails secured to the profile rails. Since such conveyor cars are also provided for drive and rail sections which deviate from the horizontal the conveyor cars bear additional gear wheels which engage in tooth racks arranged at such rail sections. The introduction of such toothed racks in the region of the destination adjustment installation avoids slippage between the running rollers or a drive roller and the profile rail.

Since several destination identifications are shiftably arranged in the guide strip several distances and hence several drive times must be monitored. This can occur for example in a manner such that for each shiftable destination identification a stationary limit stop is provided and the distances of the stationary limit stops from each other correspond to the distance of the destination characteristic positions from each other. The destination identifications must be designed for this purpose such that between them space is provided for the engagement of the limit stop. The drive times to be monitored after which the corresponding stationary limit stop is driven out of the shifting region of the destination identification respectively correspond to the distance of the destination positions of a destination identification from its initial position.

However the adjustment of several destination identifications which are shiftably arranged in a guide strip can also occur by means of a single stationary limit stop whereby after shifting of the respective first destination identification in the drive direction into its destination position the stationary limit stop releases the destination identification and prior to subsequent destination identification repeatedly engages in the shifting area. A necessary precondition is that the destination identifications be designed such that space is provided between them for engagement of the limit stop.

An advantageous further development of the invention is to render possible with simple means a precise determination of the first rest abutment of the actuating element against the destination identification at its initial position as well as the time after which further drive of the receptacle by a distance corresponding to the distance of the destination corresponding position of the destination identification from the initial position which provides a stationary sampling installation capable of being influenced by an identification mark which can be sampled and the receptacle generates a signal clock pulse corresponding to the distance of adjustment between destination characteristic positions which influence the control apparatus.

Thus the destination adjustment installation is independent of possibly occurring speed fluctuations during the passage of the receptacles. Preferably a mark sign arranged in the guide strip serves as a reference mark for the destination sampling and is employed as the identification mark.

The signal clock pulse is preferably generated in that the stationary sampling installation has a number of sampling elements which correspond to the number of destination positions and the sampling elements are arranged at a distance corresponding to the distance of the destination positions from each other. Accordingly with each arrival of the reference mark at a sampling element a clock pulse signal will be generated which either causes the stationary limit stop to stay in the shifting region of destination identification or to release a destination identification which is resting against the limit stop.

An additional advantage of the invention provides that an identifying mark sampling element which has the same relative position to the sampling elements as that of the identification mark to the destination positions influences the control installation such that in the case of a response of the identification mark sampling element the output signals of the sampling elements generated by the destination identifications shifted by them are compared with the corresponding destination information in the destination memory. The sampling elements for the reference marks are thus employed after adjustment of the destination identifications on the receptacle for a check of the adjustment. Insofar as there is recognized as a result of this check lack of agreement between the destination characteristic positions of the shifted destination identifications and the destination information which is in the destination memory corresponding corrective measures can be initiated. In this connection it is provided that in the case of non-agreement of the output signals of the sampling elements with the corresponding destination information there will be output by the control installation a control command for reversing the drive direction of the conveyor receptacle and a further control command for adjusting the actuating device with the objective of shifting all destination identifications to their initial period during the return of the conveyor receptacle.

The control and technical functions of the inventive destination adjustment installation can be realized with a low expense in a particularly advantageous fashion when the destination memory has two intersecting groups of line wires with one group connected to the destination stations along the conveyor path and the other group of which comprises a number of line wires corresponding to the number of different destination positions and according to the destination code connecting diodes are mounted at the intersection points of the line wires. Such a group of intersecting line wires can be particularly activated from several planes in a simple manner so that the circuit in the destination adjustment installation can be accomplished without great expense and with easy adaptation to particular factors of the conveyor system. Thus for example the activation of the adjustment device of the actuating element can be accomplished in a simple fashion such that the destination determining line wires are connected with a comparator which is controlled on its input by the signal clock pulse and at its output is connected with the adjustment device of the actuating element. The checking of the correct position of the shifted destination identifications subsequent to passage of the receptacles through the destination adjustment installation can proceed such that the comparator installation exhibits an additional input to which the sampling elements of the stationary sampling installation are connected.

For structurally realizing the actuating elements there are several possibilities. For example, the known design in the framework of one of the known destination adjustment installations as a core of a lifting magnet can be provided. A particularly advantageous embodiment can be seen in that the actuating element is designed as a toothed adjustment wheel which during the passage of a receptacle is constantly engaging in the shifting region with a number of teeth corresponding at least to the number of shiftable target identifications. The toothed adjustment wheel is rotatably mounted and capable of being influenced by the adjustment device in a manner such that the rotation is respectively suppressed for the phase of the destination identification shifting. So as to also render possible the shifting of several target identifications shiftably arranged in a guide strip, tooth divisions, tooth height and the tooth profile of the adjustment wheel as well as the distance and profile of the destination identification can be matched to each other such that the adjustment wheel released by the adjustment device following shifting of a destination identification is rotated by the shifted destination identification by an amount of the toothed division into a rest position against the adjacent destination identification. The actual adjustment or positioning device of the adjustment wheel can be realized in a simple fashion in that the adjustment or positioning device comprises a magnet acting on a bearing shaft of the adjustment wheel.

An additional particularly favorable realization of the actuation element particularly in view of the forces which are to be carried by the actuating element during shifting of the destination identifications can be provided when the actuating element is designed in the form of a latch or ratchet which is connected to the armature of a hinged armature magnet.

So as to assure satisfactory engagement of the actuating element in the shifting region of the destination identifications an advantageous further development of the invention provides that the actuating elements and the adjustment or positioning device be mounted in a support which is biased with a spring in the direction of the guide strip of the receptacles.

Defined placement or abutment conditions and unobstructed passage of the conveyor receptacles past the destination installation are assured in that the spring consists of several individual springs which are so designed and arranged that the actuating element has several degrees of freedom in its movement and deflection. The adaptation of the support to different receptacles can be assured in a particular simple manner in that the support has a support field which during the passage of a conveyor receptacle past the guide surface runs along the length of the guide surface.

Other objects, features and advantages of the invention will be readily apparent from the following description of certain preferred embodiments thereof taken in conjunction with the accompanying drawings although various modifications may be effected without departing from the spirit and scope of the novel concepts of the disclosure.

DESCRIPTION OF THE PREFERRED EMBODIMENTS

Figure 1:
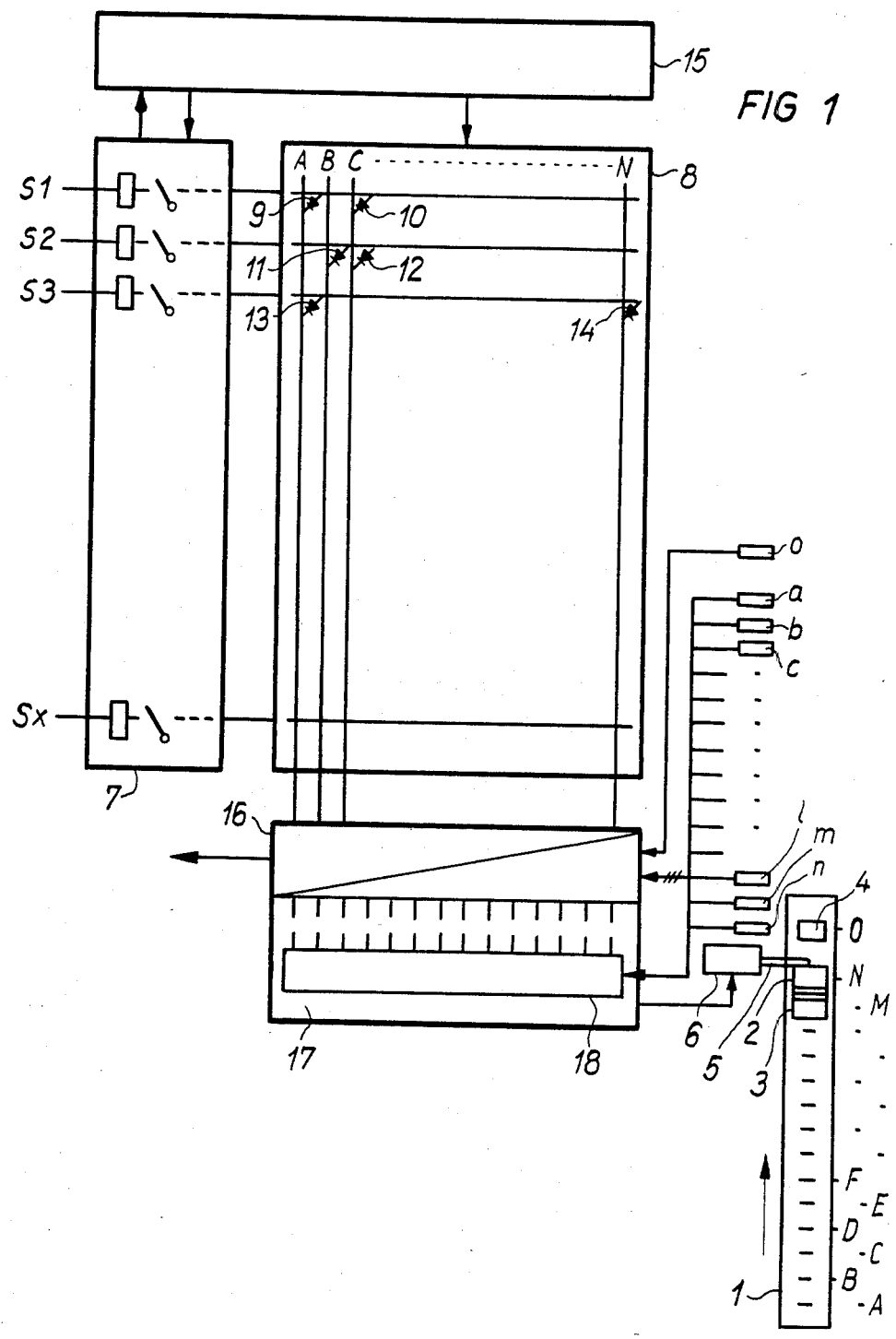
FIG. 1 is a block diagram of the destination adjustment installation of the invention.
Figure 2:
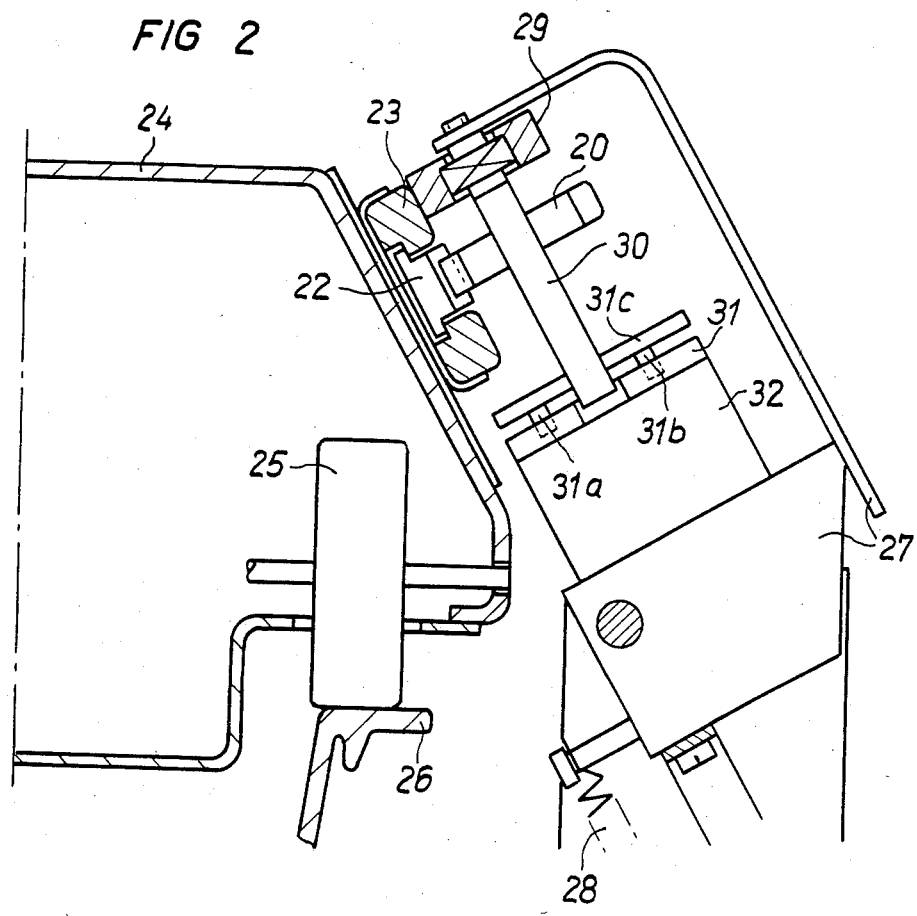
FIG. 2 is a sectional view illustrating the actuating element and its relative position to the adjustable destination identification.
Figure 3:
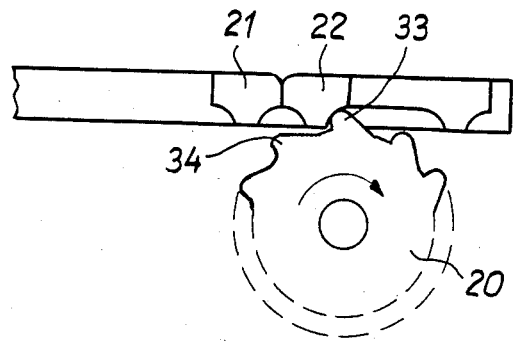
FIG. 3 is an enlarged detailed view illustrating the adjustment wheel gear.
Figure 4:
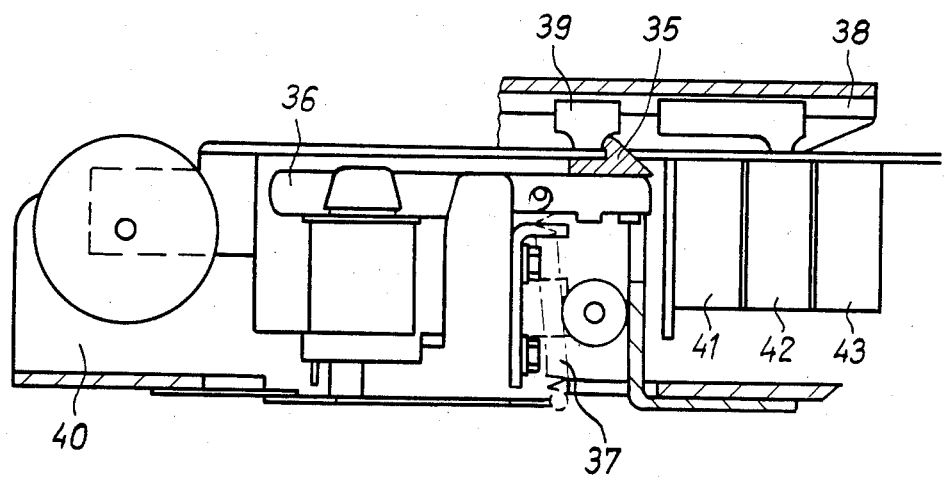
FIG. 4 is a view of a sample embodiment of the actuating element in a position engaging in the shifting region of the destination identifications.

FIG. 1 illustrates the layout of the essential components of the destination adjustment installation relative to each other. In FIGS. 2 and 3 a structural embodiment of the actuating element as well as its relative position to the adjustable destination identifications is illustrated. FIG. 4 illustrates a sample embodiment of the actuating element in a position engaging in the shifting region of the destination identifications.

FIG. 1 illustrates a guide strip 1 in which two shiftable destination identifications 2 and 3 can be placed in fourteen different indexed positions which are referenced with A, B, C . . . M and N. In position O which has a greater distance from the marginal position N than the remaining index positions A through N have respect to each other there is provided a non-shiftable fixed mark 4.

Before a non-illustrated conveyor receptacle which supports the guide strip 1 reaches the destination adjustment installation the destination identifications 2, 3 are located in the illustrated position. The guide strip 1 approaches in the direction of the illustrated arrow the actuating element 5 of the destination adjustment installation which is schematically illustrated in the form of a pin which is actuated by a magnet 6. A stationary sampling installation consists of the sampling elements a, b, c, . . . l, m, n which can be designed for example as approach initiators. In series with the sampling elements a . . . n there is ranged an additional sampling element o which has a distance from the adjacent sampling elements a which corresponds to the distance between the identification mark 4 and the indexed position N on the adjustment strip 1.

The control installation connected with the magnet 6 are with the sampling elements a . . . n, o are interconnected with an interface 7 which is connected with the stations indicated by the request switches S1, S2, S3, . . . . Sx. Associated with each feed line to one of the request switches S1 . . . Sx is a relay in the interface 7. The circuit arrangement in the interface 7 associated with each of the feed lines to the request switches S1 . . . Sx is represented in detail only for request switch S1. This circuit arrangement consists of a relay, a flip-flop, a transistor and three AND circuits.

When the request switch is actuated the relay is energized and a contact of the relay subsequently switches the flip-flop which thus applies potential to a respective one input of two AND circuits. The third AND circuit receives voltage from a control line which is connected to the control rail. The control rail will briefly have no potential at a time when the conveyor receptacle has run past the destination adjustment installation and moves into the region of the control rail. Thus the actual adjustment region for a following conveyor receptacle will be free. The transistor is thus turned on and produces a switching circuit for the relay which remains energized even after the switch S1 has opened. A shift register 15 is clock pulsed through the control line. Only one of the output lines in each instance which connect to the AND circuit or to the corresponding additional similar circuits of the interface 7 will thus carry switching potential. If the second input of the AND circuit receives switching potential, the output potential of the AND gate will be transmitted to a line which represents one of the several destination lines of a destination memory 8. The destination memory can be in the form of a matrix comprising two groups of intersecting lines with the intersection points having diodes 9 through 14 connected corresponding to the different destination identifications of the individual stations S1 through Sx as illustrated in FIG. 1. The destination characterizing column lines are referenced with A, B, C ... N which correspond to the referencing of the index position on the adjustment strip. By switching of the diodes 9 through 14 the station S1 is identified by "AC". The station S2 is identified by the destination identification "BC" and station S3 is identified by the destination identification "AN". The memory 8 has its output connected to a release or trigger control 17 which includes a comparator installation 16 and a shift register 18.

The method of operation of the entire control installation can be explained assuming a particular operating example. If it is assumed that the switch S3 is closed a particular request will be transmitted to the corresponding station. The shift register 15 transmits potential to the flip-flop not illustrated which is associated with the relay so that as a consequence of the potential on the corresponding feed line to the destination memory 8 and as a consequence of the diodes 13 and 14 the potential will be connected to switching lines A and N.

Due to the approach of the guide strip the adjustment element 5 will be disposed in its position in which it engages in the shifting region of the destination identifications 2 and 3. The fixed mark 4 is designed so that it is not seized by the adjustment element 5. At the instance at which the fixed mark 4 reaches the sampling element n through the output of the OR circuit connected to all of the sampling elements a ... n, a clock pulse signal will be transmitted to the shift register 18. The shift register thus connects potential to the AND circuit and the other input will also conduct switching potential through the diode 14. The comparator installation will thus disconnect the magnet 6 through an amplifier and the magnet will subsequently move the adjustment element 5 out of the shifting region of the destination identification 2. Behind the destination identification 2 and before the destination identification 3, the adjustment element 5 will be again conveyed back into the shifting region and thus during the subsequent passage by of the guide strip 1 the destination identification 3 is further relatively shifted relative to the guide strip 1. The clockwise occurring connection of potential to the additional outputs of the shift register 18 in the phase of the displacement of the destination identification 3 will not result in any further release of the actuating memory 5 since the corresponding lines C, B of the memory 8 do not conduct any potential.

Following further driving of the receptacle supporting the guide strip 1, the fixed mark 4 reaches the sampling element o; and subsequently a switching signal is transmitted by the sampling mark o to respectively one input of AND circuit. The respective other input to the AND gate circuits will be connected in each instance to one of the lines A, B ... N of the target memory 8. Each AND circuit which has one input provided with switching potential from the destination memory 8 will thus transmit potential to the one input of an outlet connected exclusive OR circuit; and the respective other inputs of the exclusive OR circuits will be connected to a corresponding sampling element a, b ... n. In the case of correct adjustment of the destination identifications 2, 3 coincidence with the memory information which exists in other words if the same potential is connected to both inputs of each exclusive OR gate circuit, the receptacle thus continues to be driven to the respective requesting station. In the case of non-correspondence there will be transmitted by the respective OR gate circuit Ea ... En, an error signal represented by an input arrow which is translated into a return of the conveyor receptacle to its initial position.

The actuating element illustrated in FIGS. 2 and 3 is designed in the form of a toothed adjustment wheel 20 and serves the purpose of shifting destination identifications 21, 22 in a strip guide 23 which is a component part of a conveyor car. The conveyor car comprises a travelling gear or undercarriage 24 carrying its drive installations which is provided with rollers 25 which run on correspondingly designed flanges 26 of a profile rail. The adjustment wheel 20 is mounted in a support 27 that is biased by a spring 28 such that a guide wheel 29 also mounted on the support 27 rolls off on the guide strip 23 and thus assures definite engagement ratios for the adjustment wheel 20. The adjustment wheel 20 is fixedly mounted on a shaft 30 which in its lower portion carries a brake disk 31 which accommodates journals 31a, 31b of a clutch disk 31c mounted on the shaft 30. By selective excitation of an electromagnet 32 the disk brake 31 can be released or engaged.

As is illustrated in FIG. 3 the locking of the adjustment wheel 20 results in the tooth 33 which engages the front destination identification 22 will be a fixed obstacle in the shifting area of the destination identification and during the passage of the conveyor car the destination identifications 21 and 22 will be held stationary. After the release of the adjustment wheel 20 which is accomplished with the non-illustrated control means the adjustment wheel can freely rotate and as a consequence the destination identification 22 due to rotation of the adjustment wheel will allow the next following tooth 34 to be placed in contact with the following destination identification 21. The adjustment wheel 20 will again be locked with the teeth in this position and the lock will be maintained until the index or detent position provided for the destination identification 21 has been reached.

In the sample embodiment of the destination adjustment illustrated in FIG. 4 the actuating element is designed in the form of a ratchet latch 35 which is a part of a hinged armature 36 of a magnetic system and since its mounted on a hinged armature and the hinged armature is stressed by means of a spring 37 such that the latch or ratchet 35 in the rest state is positioned outside the shifting region of the destination identification 39 which is guided in a guide strip 38. A rotatably mounted support 40 simultaneously accommodates the sampling elements 41, 42 and 43 and is only schematically illustrated.

It is seen that the invention provides a new and novel destination adjustment installation and although it has been described with respect to the preferred embodiments it is not to be so limited as changes and modifications may be made therein which are in the full intended scope as defined by the appended claims.

We claim as our invention:

1. A destination adjustment installation for adjustment of a destination identification member on a lateral wall of receptacle cars guided on a transport path in a path direction-parallel guide strip, said destination identification member being shiftable from an initial position which is the same for all receptacle cars to different destination positions, comprising, actuating means energizable under the control of a destination memory of a control installation of the destination adjustment installation whereby the shifting movement of said destination identification member is caused by the passage of the receptacle cars past the destination adjustment installation in such a manner that the actuating means, from the time of its contact against said destination identification member disposed in the initial position until the release of a control command by the control installation, engages said destination identification member for shifting said member a distance corresponding to the distance of the destination position from the initial position due to further driving of the receptacle, a stationary sampling installation adjacent said transport path energizable by passage of a car thereby, wherein said actuating means is a single actuating element which is operable as a stationary limit stop and wherein, upon energization, said stationary sampling installation generates a signal clock pulse corresponding to the distance between destination positions, which pulse energizes said control installation.

2. A destination adjustment installation in accordance with claim 1 wherein a path direction-parallel guide strip is presented on a lateral wall of at least one receptacle car and wherein a plurality of destination identification members are positioned in-line along said guide strip and wherein following shifting of the first of said plurality of destination identification members by said single actuating element into a first destination position said element is releasable from said first destination identification member and repeatedly engagable in a destination member shifting position prior to contact with the following destination identification member in in-line position.

3. A destination adjustment installation in accordance with claim 2 wherein said guide strip has a marking sign thereon which sign serves as a reference mark for sampling by said stationary sampling installation.

4. A destination adjustment installation in accordance with claim 3 wherein said stationary sampling installation has a plurality of sampling elements which correspond to a plurality of destination positions, wherein said different destination positions along said guide strip are spaced apart from one another and wherein said sampling elements are spaced from one another distances corresponding to the distances of said destination positions from one another.

5. A destination adjustment installation in accordance with claim 4 wherein said stationary sampling installation has sampling elements (a, b, . . . n) and wherein said guide strip has destination position (A, B, . . . N) and wherein an identification mark comprises a sampling element (o) having the same relative position to the sampling elements (a, b, . . . n) as that of the reference mark (O) to the said destination positions (A, B, . . . N) and wherein actuation of the identification mark sampling element effects generation of an output signal by the sampling elements (a, b, . . . n) and output signals generated by the shifted destination identification information are compared with the corresponding destination information in a destination memory.

6. A destination adjustment installation in accordance with claim 5 wherein non-agreement of the output signals of the sampling elements (a, b, . . . n) with destination information produces an output by the control installation and wherein a control command for the reversal of the drive direction of said car.

7. A destination adjustment installation in accordance with claim 6 wherein said destination memory comprises a matrix of two intersecting groups of line wires and wherein one of said groups of line wires is connected with destination stations along the said transport path and the other group of line wires correspond to the number of different destination positions and wherein connection diodes are connected at the intersection points of said line wires.

8. A destination adjustment installation in accordance with claim 7 wherein said single actuated element is designed in the form of a toothed adjustment wheel which constantly engages in the path of a destination identification member during passageby of a receptacle car and wherein said wheel has a number of teeth corresponding at least to the number of shiftable destination identification positions, said toothed adjustment wheel being rotatably mounted and capable of being shifted against rotation to effect movement of said destination identification member upon passage of said receptacle cars along said transport path.

9. A destination adjustment installation in accordance with claim 8 wherein the tooth separation, tooth height, tooth profile of said adjustment wheel and the distance and profile of said destination identification members are so matched to one another that the adjustment wheel after shifting of a destination identification member is rotated past the said shifted destination identification member by an amount of the tooth division into a contact position with the next adjacent in-line destination member.

10. A code-setting system for a conveyor wherein a destination or function code is applied to a traveling unit of the conveyor upon movement of the traveling unit past a code-setting station, said system comprising:
at least one coded member shiftable in the direction of travel of said unit and provided on a side thereof facing said station, said at least one coded member being selectively positionable in one of a number of preselected positions along said unit;
a retractable code-setting member at said station aligned with said at least one coded member in said direction in an extended position whereby said code-setting member can engage said at least one coded member to dispose the same at a preselected position on said unit whereby said unit moves past the code-setting member while said code-setting member is extended to selectively position said at least one coded member;
position detecting means at said station and on said unit for signaling each of a plurality of relative positions between said unit and said station as said unit passes said station; and
means responsive to said position detecting means for actuating said code setting member to retract the code setting member upon positioning of said at least one coded member in said one preselected position along said unit corresponding to the respective detected relative positions of said unit to said station.

11. A code-setting system for a conveyor wherein a destination or function code is applied to a traveling unit of the conveyor upon movement of the traveling unit past a code-setting station, said system comprising:
a plurality of coded members shiftable in the direction of travel of said unit and provided on a side thereof facing said station, said coded members being each selectively positionable in one of a number of preselected positions along said unit in said direction;

at least one retractable code-setting member at said station aligned with said coded members in said direction in an extended position of said code-setting member whereby said code-setting member can engage at least one of said coded members to dispose the same at a selected position, only a single code-setting member being disposed in an alignment with each coded member in said direction whereby each coded member moves past the respective code-setting member while the same is extended to selectively position the code member;

position-detecting means at said station and on said unit for signaling each of a plurality of relative positions between said vehicle and said unit as said vehicle passes said unit; and means responsive to said position-detecting means for actuating said code-setting member to retract the same upon displacement of each coded member into a selected position corresponding to the respective detected relative position of said unit to said station.

12. The system defined in claim 11 wherein a plurality of coded members are provided in line and spaced apart in said direction on said unit and only a single code-setting member is provided at said station and successively engages said coded members for the positioning thereof.

13. A code-setting system for a conveyor wherein a destination or function code is applied to a traveling unit of the conveyor upon movement of the traveling unit past a code-setting station, said system comprising:

a plurality of coded members shiftable in the direction of travel of said unit and provided on a side thereof facing said station, said coded members being each selectively positionable in one of a number of preselected positions along said unit in said direction;

at least one retractable code-setting member at said station aligned with said coded members in said direction in an extended position of said code-setting member whereby said code-setting member can engage at least one of said coded members to dispose the same at a selected position, only a single code-setting member being disposed in an alignment with each coded member in said direction;

position-detecting means at said station and on said unit for signaling the instantaneous position of said vehicle relative to said unit; and means responsive to said position-detecting means for actuating said code-setting member to retract the same upon displacement of each coded member into a selected position corresponding to the respective detected instantaneous position of said unit relative to said station, said position-detecting means including a position-indicating element on said unit and a position-detecting element on said station juxtaposed with said position-indicating element, at least one of said elements having a plurality of spaced-apart members cooperating with the other element to signal the position of said unit relative to said station.

14. The system defined in claim 13 wherein a plurality of sensors is spaced apart on said station in said direction to form said position-detecting element.

15. The system defined in claim 13 or claim 14 wherein a plurality of coded members are provided in line and spaced apart in said direction on said unit and only a single code-setting member is provided at said station and successively engages said coded members for the positioning thereof.

* * * * *